United States Patent
Abdulkhair et al.

(10) Patent No.: US 12,458,662 B1
(45) Date of Patent: Nov. 4, 2025

(54) ANTICANCER AGENTS COMPRISING A g-C3N4@CuO/MgAl2O4 NANOHYBRID

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/174,523

(22) Filed: Apr. 9, 2025

(51) Int. Cl.
- A61K 33/08 (2006.01)
- A61K 33/34 (2006.01)
- A61K 33/44 (2006.01)
- A61P 35/00 (2006.01)

(52) U.S. Cl.
CPC .............. *A61K 33/08* (2013.01); *A61K 33/34* (2013.01); *A61K 33/44* (2013.01); *A61P 35/00* (2018.01)

(58) Field of Classification Search
None
See application file for complete search history.

(56) References Cited

FOREIGN PATENT DOCUMENTS

| | | |
|---|---|---|
| CN | 100482080 C | 4/2009 |
| CN | 105535972 A | 5/2016 |
| CN | 118099584 A | 5/2023 |
| IN | 202341003484 | 7/2024 |
| IN | 202311022975 | 10/2024 |

OTHER PUBLICATIONS

Pourmadadi et al., Journal of Drug Delivery Science and Technology, (2023), 79, 104001, 13 pages.*
S. Kumaraguru, et al.. "Design and development of CuO-ZnO nanospheres decorated g-CSN4 nanocomposite with superior antimicrobial and anticancer activities", Biomass Conversion and Biorefinery, vol. 13, April 4. 2023,p p. 16227-16239 (13 pages).
T.V. Nitha, et al., "Synthesis of MgAl2O4/gC3N4 nanocomposite and evaluation of their antioxidant properties by FRAP assay", Journal of Physics: Conference Series 2801, 2024 (7 pages).

* cited by examiner

*Primary Examiner* — Brian J Davis
(74) *Attorney, Agent, or Firm* — Oblon, McClelland, Maier & Neustadt, L.L.P.

(57) ABSTRACT

A method of inhibiting cell growth in a cancer includes contacting a graphite-phase carbon nitride copper oxide and magnesium aluminum oxide (g-$C_3N_4$@CuO/MgAl$_2$O$_4$) nanocomposite with the cancer to inhibit growth of the cancer. The g-$C_3N_4$@CuO/MgAl$_2$O$_4$ nanocomposite comprises a graphite-phase carbon nitride (g-$C_3N_4$) in an amount of 2 to 18 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ nanocomposite. The cancer includes cells from a cell line selected from a group consisting of a human hepatocellular carcinoma (HepG-2) cell line and a human breast carcinoma (MCF-7) cell line.

19 Claims, 5 Drawing Sheets

ANTICANCER AGENTS COMPRISING A g-C3N4@CuO/MgAl2O4 NANOHYBRID

BACKGROUND

Technical Field

The present disclosure is directed to a nanohybrid, particularly a graphite-phase carbon nitride copper oxide and magnesium aluminum oxide (g-$C_3N_4$@CuO/MgAl$_2$O$_4$) nanocomposite having anti-proliferative activity against cancer cells.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cancer is the leading cause of death and disability due to its complicated pathological process. Various methods, such as chemotherapy, radiation therapy, immunotherapy, and surgery, have been developed for treatment of different types of cancers; however, conventional chemotherapy methods often lack specificity and have adverse effects like cytotoxicity, low therapeutic indices, low bioavailability, insolubility, high dose requirements, non-specific targeting, and development of multiple drug resistance. Resistance to cancer treatments, indicated by overexpression of drug efflux transporters, anoxic conditions, and abnormal apoptotic pathways, exists. To address these challenges, nanomaterials (NMs) have gained interest as potential anticancer agents [Mandal, A. K., Nanomaterials as targeted delivery system of therapeutics for inhibition of cancer, *Journal of Drug Delivery and Therapeutics*, 2023, 13, 12, 201-223; and Algethami, F. K. et al., Fast fabrication of bismuth oxyiodide/carbon-nanofibers composites for efficient antiproliferation of liver and breast cancer cells, *Zeitschrift für anorganische und allgemeine Chemie*, 2021, 647, 19, 1921-1929].

Nanomaterials (NMs) possess unique properties that enhance specificity and efficacy of therapies while minimizing side effects. Unlike traditional cancer treatments, which often affect both cancerous and healthy cells, nanomaterials can be engineered to target tumor cells more precisely. This targeted approach is largely facilitated by the enhanced permeability and retention (EPR) effect, where nanoparticles accumulate in tumor tissues due to the abnormal blood vessel architecture and impaired lymphatic drainage associated with tumors when compared to other larger particles and conventional drugs [Nanosystem delivery and devices: Treatment and therapy, *National Cancer Institute*, 2023].

Nanomaterials can be engineered for specific targeting of cancer cells, allowing for localized treatment that minimizes damage to surrounding healthy tissues. [Zhu, R. et al., Current Progress in Cancer Treatment Using Nanomaterials, *Front Oncol.*, 2022, 12, 930125]. Size, shape, and surface optimization of NMs improves targeting efficiency and circulation time, which can increase the targeting potential of anticancer cargos. NMs can boost therapeutic efficacy by controlled release of therapeutic agents to cancer sites through encapsulation or coupling with ligands. In cancer treatment, NMs are often used to target cancer cells, tumor microenvironment, and/or immune system primarily through stimuli-responsive targeting or by modifying their surfaces with targeting ligands like transferin, integrins, sugar, folic acid, and/or antibodies to improve tissue targeting recognition and internalization.

By leveraging their nanoscale properties, these materials can achieve preferential accumulation at tumor sites, thereby increasing the local concentration of therapeutic agents. Existing nanomaterials include liposomal formulations and nanocomposites based on organic and inorganic substances. Some examples of commonly used nanocomposites are graphene nanocomposites, polymeric nanocomposites, and nanocomposites comprising selenium, gold and oxides of zinc, cadmium, titanium and the like.

Nanocomposites often face challenges in terms of their bioavailability, biosafety, and scalability. To overcome these issues, nanohybrids are being developed that combine the properties of different nanomaterials. For example, a nanohybrid composed of gold nanoparticles and mesoporous silica has been developed to deliver therapeutic agents precisely to cancer cells with minimal side effects [Mulikova, T. et al., Mesoporous silica decorated with gold nanoparticles as a promising nanoprobe for effective CT X-ray attenuation and potential drug delivery, *Nano-Structures & Nano-Objects*, 2021, 26]. Another nanohybrid consisting of cobalt ferrite magnetic nanoparticles combined with graphene oxide is used for treatment of hyperthermia of breast cancer tumors [Hatamie, S. et al., Hyperthermia of breast cancer tumor using graphene oxide-cobalt ferrite magnetic nanoparticles in mice, *Journal of Drug Delivery Science and Technology*, 2021, 65].

There still exists a need to develop nanomaterials that have a high scalability, biocompatibility, and reduced cytotoxicity. Accordingly, it is an object of the present disclosure to provide a method of inhibiting cell growth in a cancer with a nanomaterial comprising a graphite-phase carbon nitride copper oxide and magnesium aluminum oxide (g-$C_3N_4$@CuO/MgAl$_2$O$_4$) material for treatment of cancers that are safe, highly stable, and may help to overcome drug resistance. Another object of the present disclosure is to provide a nanohybrid comprising materials that may circumvent the drawbacks and limitations of methods and materials known in the art and that have enhanced specificity for cancer cells, higher efficacy, and have minimal or no adverse affects on healthy cells.

SUMMARY

In an exemplary embodiment, a method of inhibiting cell growth in a cancer is described. The method comprises contacting a graphite-phase carbon nitride copper oxide and magnesium aluminum oxide (g-$C_3N_4$@CuO/MgAl$_2$O$_4$) nanocomposite with the cancer to inhibit growth of the cancer. The g-$C_3N_4$@CuO/MgAl$_2$O$_4$ nanocomposite comprises a graphite-phase carbon nitride (g-$C_3N_4$) in an amount of 2 to 18 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ nanocomposite. The cancer includes cells from a cell line selected from a group consisting of a human hepatocellular carcinoma (HepG-2) cell line and a human breast carcinoma (MCF-7) cell line.

In some embodiments, the cell line is the HepG-2 cell line and the g-$C_3N_4$@CuO/MgAl$_2$O$_4$ nanocomposite has a half-maximal inhibitory concentration (IC$_{50}$) value of 50 to 70 µg/mL.

In some embodiments, the cell line is the MCF-7 cell line and the g-$C_3N_4$@CuO/MgAl$_2$O$_4$ nanocomposite has a half-maximal inhibitory concentration (IC$_{50}$) value of 100 to 120 µg/mL.

In some embodiments, the method includes contacting the cancer with the g-$C_3N_4$@CuO/MgAl$_2$O$_4$ nanocomposite at a concentration of 1 µg/mL or more.

In some embodiments, the cell line is less than 15% viable after contacting with the g-$C_3N_4$@CuO/MgAl$_2$O$_4$ nanocomposite concentration of 500 µg/mL.

In some embodiments, the g-$C_3N_4$@CuO/MgAl$_2$O$_4$ nanocomposite comprises a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

In some embodiments, the g-$C_3N_4$ is in the form of nanosheets having an average length of 100 to 500 nm and an average width of 50 to 250 nm.

In some embodiments, the copper oxide and the MgAl$_2$O$_4$ are in the form of nanoparticles having an average size of 2 to 10 nm and wherein the copper oxide and the MgAl$_2$O$_4$ nanoparticles are dispersed on the g-$C_3N_4$ nanosheets.

In some embodiments, the g-$C_3N_4$@CuO/MgAl$_2$O$_4$ nanocomposite has a Brunauer-Emmett-Teller (BET) surface area of 15 to 30 m$^2$ g$^{-1}$.

In some embodiments, the g-$C_3N_4$@CuO/MgAl$_2$O$_4$ nanocomposite is porous and has an average pore diameter of 5 to 10 nm.

In some embodiments, the g-$C_3N_4$@CuO/MgAl$_2$O$_4$ nanocomposite is porous and has an average pore volume of 0.01 to 0.2 cm$^3$g$^{-1}$.

In some embodiments, the g-$C_3N_4$@CuO/MgAl$_2$O$_4$ nanocomposite is porous, and the pores are in the form of slits.

In some embodiments, the g-$C_3N_4$@CuO/MgAl$_2$O$_4$ nanocomposite is crystalline.

In some embodiments, the g-$C_3N_4$@CuO/MgAl$_2$O$_4$ nanocomposite comprises a copper oxide (CuO) phase, a magnesium oxide (MgO) phase, a magnesium aluminum oxide (MgAl$_2$O$_4$) phase, and a graphite-phase carbon nitride (g-$C_3N_4$) phase.

In some embodiments, the MgAl$_2$O$_4$ phase is spinel.

In some embodiments, the MgO phase is cubic.

In some embodiments, the g-$C_3N_4$@CuO/MgAl$_2$O$_4$ nanocomposite does not comprise aluminum oxide (Al$_2$O$_3$).

In some embodiments, the g-$C_3N_4$@CuO/MgAl$_2$O$_4$ nanocomposite is made by a process, comprising mixing a magnesium salt, an aluminum salt, a copper salt, and a fuel in water to form a mixture; heating the mixture to form a solid product; calcinating the solid product at a temperature of 600° C. to 800° C. for 2 to 4 hours to form a product; mixing the product with urea and heating to a temperature of 550° C. to 650° C. for 20 to 60 minutes to form the g-$C_3N_4$@CuO/MgAl$_2$O$_4$ nanocomposite.

In some embodiments, the fuel is menthol.

In some embodiments, the method comprises administering the g-$C_3N_4$@CuO/MgAl$_2$O$_4$ nanocomposite to a subject having cancer; and reducing a number of cancer cells in the subject having cancer.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
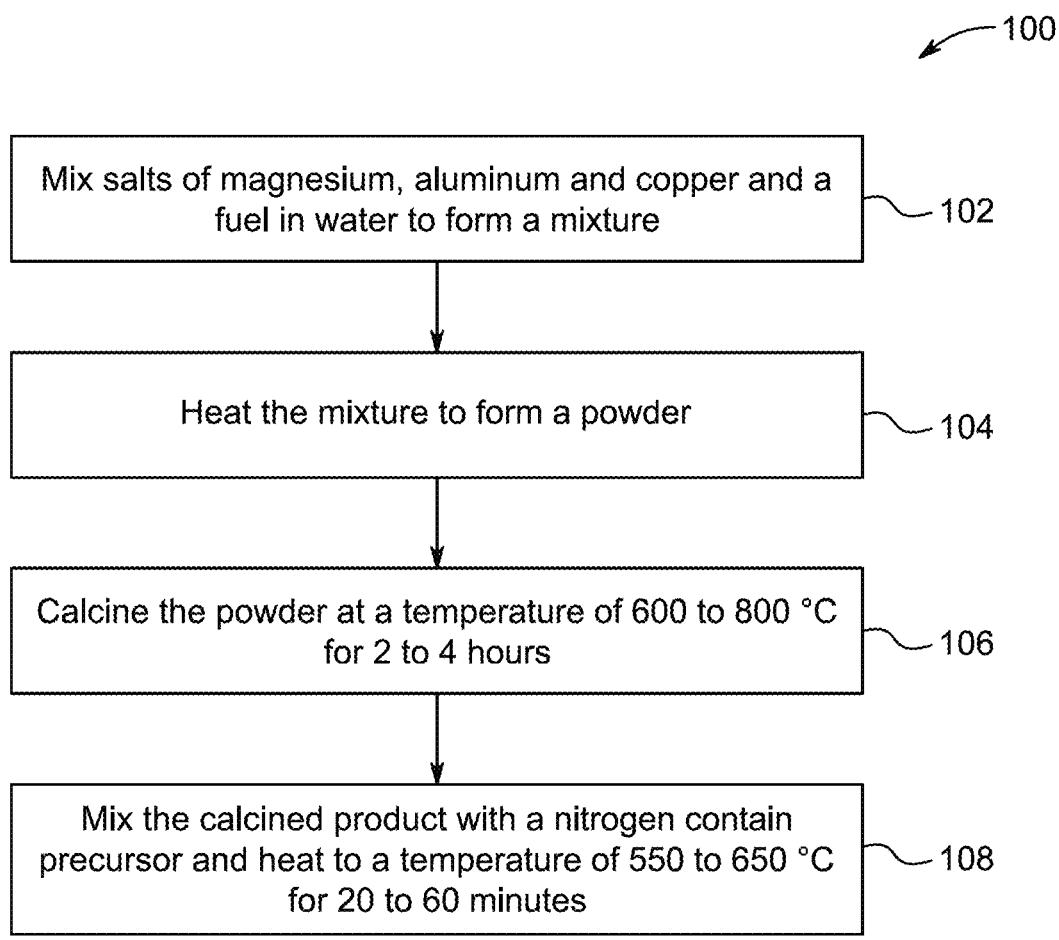
FIG. 1 is a flow chart depicting a method of synthesis of a g-$C_3N_4$@CuO/MgAl$_2$O$_4$ nanocomposite (also referred to as nanocomposite), according to certain embodiments.

In the drawings, reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "compound" refers to a chemical entity, whether a solid, liquid, or gas, and whether in a crude mixture or isolated and purified.

As used herein, the term "particle size" may be considered as the lengths or longest dimensions of a particle.

As used herein, the term "pore size" refers to the average diameter or width of pores within a material, typically determined by methods such as nitrogen adsorption-desorption, mercury intrusion porosimetry, and/or scanning electron microscopy (SEM). Pore size is a parameter for characterizing the porosity and surface area of materials, especially in nanocomposites or catalysts.

As used herein, the term "surface area" refers to the total area of an exposed surface of a material per unit of mass or volume. It is typically measured in square meters per gram (m$^2$/g) and is a parameter for characterizing the adsorption capacity, reactivity, and porosity of a material, such as a nanocomposite. Surface area provides insights into how well a material can interact with other substances, such as molecules of a dye or other pollutants in a solution.

As used herein, the term "nanocomposite" refers to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. Nanocomposites may be used in various applications, including catalysis, environmental remediation, electronics, and materials science.

As used herein, the term "nanohybrid" refers to a composite material that combines nanoparticles with other substances to enhance its properties.

As used herein, the term "half-maximal inhibitory concentration ($IC_{50}$) value" refers to the concentration of a substance required to inhibit a biological or biochemical process by 50%.

As used herein, the term "precursor" refers to a substance from which another substance is formed in a biological, biochemical, or a chemical process.

As used herein, the term "Human Hepatocellular Carcinoma (HepG-2" or "HepG-2 cell line" refers to an immortal cell line isolated in 1975 from the hepatocellular carcinoma of a 15-year-old Caucasian male from Argentina.

As used herein, the term "MCF-7 cell line" refers to a breast cancer cell line isolated from the pleural effusion of a 69-year-old woman with metastatic mammary carcinoma.

As used herein, the term "slit" or "slit-like" refers to an opening having a height that is substantially longer, e.g., 2×, 3×, 4×, 5×, or 10× greater, than the width of the opening.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

Unless otherwise noted, the present disclosure is intended to include all isotopes of a given compound or formula.

Aspects of the present disclosure are directed a method of inhibiting cell growth in a cancer with a nanocomposite comprising g-$C_3N_4$@CuO/MgAl$_2$O$_4$ against Human Hepatocellular Carcinoma (HepG-2) and human Breast carcinoma (MCF-7) cell lines. A decrease in the survival rate of MCF-7 cells was observed when exposed to a nanocomposite dosage of 4.0 μg/ml. The half-maximal inhibitory concentration ($IC_{50}$) was determined to be 107.41 μg/mL. At a 500 μg/mL dosage of the nanocomposite, there was a 90% reduction in MCF-7 cell viability. In the case of HepG-2 cell lines, a variable concentration of 3.0 to 500 μg/mL of the nanocomposite was taken and the viability of HepG-2 cells began to decrease at a dose as low as 4.0 μg/mL. The half-maximal inhibitory concentration ($IC_{50}$) was calculated to be 61.96 μg/mL, and a 90% reduction in the viability of HepG-2 cells was detected at a maximum dose of 500 μg/mL of the nanocomposite.

Aspects of the present disclosure pertain to a method of inhibiting cell growth in a cancer. The method includes contacting a graphite-phase carbon nitride copper oxide and magnesium aluminum oxide (g-$C_3N_4$@CuO/MgAl$_2$O$_4$) nanocomposite with the cancer to inhibit growth of the cancer. The g-$C_3N_4$@CuO/MgAl$_2$O$_4$ nanocomposite (also referred to as "nanocomposite") comprises a graphite-phase carbon nitride (g-$C_3N_4$) in an amount of 2 to 18 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ nanocomposite. The g-$C_3N_4$@CuO/MgAl$_2$O$_4$ nanocomposite comprises carbon nitride in graphite phase (g-$C_3N_4$). The graphite-phase carbon nitride (g-$C_3N_4$) consists of heptazine units where three triazine rings are fused together and are connected via planar amino groups. The g-$C_3N_4$ is found to possess discrete electronic and chemical properties due to the presence of nitrogen atoms within the lattice. The nanocomposite comprises g-$C_3N_4$ in an amount of 2 to 18 percent by weight (wt. %) based on a total weight of the nanocomposite. In certain embodiments, the g-$C_3N_4$ is present in the nanocomposite in an amount of 3 to 17 wt. %, preferably 4 to 16 wt. %, preferably 5 to 15 wt. %, preferably 6 to 14 wt. %, preferably 7 to 13 wt. %, preferably 8 to 12 wt. %, more preferably 9 to 11 wt. %, and yet more preferably about 10 wt. % based on a total weight of the nanocomposite. In a preferred embodiment, the g-$C_3N_4$ is present in an amount of 10 wt. % based on a total weight of the nanocomposite.

In some embodiments, the g-$C_3N_4$ may exist in various morphological shapes, such as nanowires, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, mixtures thereof, and the like. In preferred embodiments, the g-$C_3N_4$ is in the form of nanosheets.

In some embodiments, the g-$C_3N_4$ is in form of nanosheets having an average length of about 100 to 500 nm, preferably 125 to 450 nm, preferably 150 to 400 nm, preferably 175 to 350 nm, preferably 200 to 300 nm, preferably 210 to 250 nm, more preferably 220 to 230 nm, and yet more preferably about 222 nm, and an average width of about 50 to 250 nm, preferably 75 to 200 nm, preferably 100 to 150 nm, preferably 125 to 145 nm, more preferably 130 to 140 nm, and yet more preferably about 135 nm. Nanosheets may be preferred for their enhanced physical and chemical properties and relatively large surface area for chemical processes. The length and width of the nanosheets may be varied to obtain nanosheets with desired strength and flexibility.

The nanocomposite comprises copper oxide in an amount of 1 to 10 percent by weight (wt. %) based on a total weight of the nanocomposite. In certain embodiments, the nanocomposite comprises copper oxide in an amount of 1.5 to 9 wt. %, preferably 2 to 8 wt. %, preferably 3 to 7 wt. %, preferably 3.5 to 6.5 wt. %, more preferably 4 to 6 wt. %, and yet more preferably 4.5 to 5.5 wt. % based on a total weight of the nanocomposite. In a preferred embodiment, the nanocomposite comprises copper oxide in an amount of 5 wt. % based on the total weight of the nanocomposite.

In some embodiments, the nanocomposite comprises magnesium aluminum oxide (MgAl$_2$O$_4$) in an amount of 75 to 95 wt. %. In certain embodiments, the nanocomposite comprises 76 to 94 wt. %, preferably 77 to 93 wt. %, preferably 78 to 92 wt. %, preferably 79 to 91 wt. %, preferably 80 to 90 wt. %, preferably 81 to 89 wt. %, preferably 82 to 88 wt. %, preferably 83 to 87 wt. %, more preferably 84 to 86 wt. %, and yet more preferably 84.5 to 85.5 wt. %. In a preferred embodiment, magnesium aluminum oxide (MgAl$_2$O$_4$) is present in an amount of 85 wt. % based on the total weight of the nanocomposite.

In some embodiments, the copper oxide and the MgAl$_2$O$_4$ may exist in various morphological shapes, such as nanowires, nanosheets, nanocrystals, nanoparticles, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like. In preferred embodiment, the copper oxide and the $MgAl_2O_4$ is in the form of spherical nanoparticles. In some embodiments, the copper oxide and the $MgAl_2O_4$ are in the form of spherical nanoparticles and are dispersed on the $g-C_3N_4$ nanosheets.

In some embodiments, the $g-C_3N_4$ nanosheets are thin, flat sheets (nanosheets) composed of layers held together by Van der Waals forces. In some embodiments, the overlaying layers of nanosheets have nanoparticles uniformly dispersed on their surfaces where the nanoparticles are copper oxide and $MgAl_2O_4$ nanoparticles. A homogenous dispersion of nanoparticles on the nanosheets may allow a sustained release of the nanocomposite that may enhance their therapeutic efficiency. In some embodiments, the nanoparticles may attain different shapes including spherical, rod-like, cubical, disc-shaped, hollow, branched or star-shape. In specific embodiments, the nanoparticle may have spherical or rod-like shape. In a preferred embodiment, the nanoparticles have spherical shape.

In some embodiments, the copper oxide and $MgAl_2O_4$ nanoparticles have an average size of 2 to 10 nm, preferably 3 to 9 nm, preferably 4 to 8 nm, preferably 4.5 to 7 nm, more preferably 5 to 6 nm, and yet more preferably about 5.4 nm.

In some embodiments, the $g-C_3N_4@CuO/MgAl_2O_4$ nanocomposite comprises graphite-phase carbon nitride ($g-C_3N_4$) in an amount of 5 to 15 wt. %, copper oxide in an amount of 3 to 7 wt. %, and magnesium aluminum oxide ($MgAl_2O_4$) in an amount of 80 to 90 wt. % based on a total weight of the nanocomposite. In another embodiment, the nanocomposite comprises $g-C_3N_4$ in an amount of 8 to 12 wt. %, copper oxide in an amount of 4 to 6 wt. %, and $MgAl_2O_4$ in an amount of 84 to 86 wt. % based on a total weight of the nanocomposite. In preferred embodiments, the nanocomposite comprises $g-C_3N_4$ in an amount of about 10 wt. %, copper oxide in an amount of about 5 wt. %, and $MgAl_2O_4$ in an amount of about 85 wt. % based on a total weight of the nanocomposite.

In some embodiments, the Brunauer-Emmett-Teller (BET) surface area for the $g-C_3N_4@CuO/MgAl_2O_4$ nanocomposite is in a range of 15 to 30 square meters per gram ($m^2/g$). Brunauer-Emmett-Teller (BET) is a technique for measuring specific surface areas of materials, including nanocomposites. BET surface area also helps to determine the pore size and material characteristics. In certain embodiments, the BET surface area for the nanocomposite is 16 to 29 $m^2 g^{-1}$, preferably 17 to 28 $m^2 g^{-1}$, preferably 18 to 27 $m^2 g^{-1}$, preferably 19 to 26 $m^2 g^{-1}$, preferably 20 to 25 $m^2 g^{-1}$, preferably 21 to 24.5 $m^2 g^{-1}$, preferably 22 to 24 $m^2 g^{-1}$, more preferably 23 to 24 $m^2 g^{-1}$, and yet more preferably about 23.21 $m^2 g^{-1}$.

In some embodiments, the nanocomposite is porous and has an average pore diameter of 5 to 10 nm, preferably 6 to 9.5 nm, preferably 7 to 9 nm, more preferably 8 to 8.5 nm, and yet more preferably about 8.34 nm.

In some embodiments, the nanocomposite is porous and has an average pore volume of 0.01 to 0.2 $cm^3/g$, preferably 0.02 to 0.18 $cm^3/g$, preferably 0.03 to 0.16 $cm^3/g$, preferably 0.04 to 0.14 $cm^3/g$, preferably 0.05 to 0.12 $cm^3/g$, preferably 0.06 to 0.1 $cm^3/g$, preferably 0.07 to 0.09 $cm^3/g$, more preferably 0.075 to 0.085 $cm^3/g$, and yet more preferably about 0.081 $cm^3/g$.

In some embodiments, the nanocomposite is porous. In some embodiments, the nanocomposite is porous, and the pores may be in the form of cylinders, cones, spheres, tubes, funnels, irregular shapes, spherical voids, mesopores, micropores, macropores, capillaries, hexagonal pores, cubic pores, elongated pores, elliptical pores, slits, slit-like channels, plate-like pores, interconnected pores, branched pores, toroidal pores, spherical voids, cylindrical channels, oval pores, pocket pores, tubular pores, lamellar pores, nested pores, open pores, closed pores, porosity networks, wavy pores, zigzag pores, star-shaped pores, jagged pores, pyramidal pores, polyhedral pores, prism-shaped pores, web-like pores, tunnel pores, multi-sized pores, a combination thereof, and the like. In a preferred embodiment, the nanocomposite is porous, and the pores are in the form of slits.

In some embodiments, the nanocomposite is crystalline. The crystalline nanocomposite has a highly ordered lattice structure. Such nanocomposites are highly stable and have enhanced mechanical strength and thermal stability.

In some embodiments, the nanocomposite includes a copper oxide (CuO) phase, a magnesium oxide (MgO) phase, a magnesium aluminum oxide ($MgAl_2O_4$) phase, and a graphite-phase carbon nitride ($g-C_3N_4$) phase.

In some embodiments, the phases may include but are not limited to crystalline, amorphous, monoclinic, orthorhombic, tetragonal, hexagonal, cubic, rhombohedral, triclinic, triclinic polymorph, spinel, tenorite, and a combination thereof. In an embodiment, the $MgAl_2O_4$ phase is spinel. In another embodiment, the MgO phase is cubic. In yet another embodiment, the CuO phase is tenorite. In some embodiments, the nanocomposite does not comprise aluminum oxide ($Al_2O_3$).

In one embodiment, a method of forming the $g-C_3N_4@CuO/MgAl_2O_4$ nanocomposite (also referred to as nanocomposite) is described. FIG. 1 illustrates a schematic flow chart of a method 100 of forming the nanocomposite. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing salts of magnesium, aluminum and copper and a fuel in water to form a mixture. Suitable magnesium salts that may be used include, but are not limited to, magnesium oxide, magnesium carbonate, magnesium sulfate, magnesium nitrate, magnesium hydroxide, a combination thereof, and the like. Magnesium nitrate is particularly useful for preparation of nanocomposites owing to its high solubility, thermal stability and biocompatibility. In a preferred embodiment, the magnesium salt is magnesium nitrate.

The aluminum salt may include, but is not limited to, aluminum hydroxide, aluminum oxide, aluminum nitrate, aluminum chloride, a combination thereof, and the like. In some embodiments, the aluminum salt may be aluminum chloride. In a preferred embodiment, the aluminum salt is aluminum nitrate. In some embodiments, the copper salt may include, but is not limited to, copper chloride, copper nitrate, copper sulfate, copper oxide, a combination thereof, and the like. In certain embodiments, the copper salt may be copper oxide. In other embodiments, the copper salt may be copper chloride. In a preferred embodiment, the copper salt is copper nitrate.

The salts are added to a reaction container followed by the addition of a fuel. The fuel reacts with oxidizing agents present in the salts to form the respective oxides. This process is accompanied by a release of energy that generates high temperatures for the synthesis process. The high temperature facilitates the nucleation and growth of nanoparticles while the gases produced create pores within the nanocomposite. Suitable fuels that can be added to the salt solution include, but are not limited to, urea, glycine, ammonium acetate, menthol, a combination thereof, and the like. In some embodiments, urea is used as a fuel. In a preferred embodiment, the fuel is menthol.

Water is gradually added to the reaction container comprising the salts and the fuel. The water can be tap water, distilled water, double distilled water, deionized water, deionized distilled water, reverse osmosis water, a combination thereof, and the like. In some embodiments, the water is distilled water. The mixture is stirred constantly during the addition of water. Stirring may be performed until the metal oxides and fuel are well-dispersed in water and a uniform mixture is obtained.

At step 104, the method 100 includes heating the mixture to form a powder. The heating may be done using a heating device. The heating device may be a furnace, hot plate, an industrial oven, or the like. While heating, the temperature is gradually increased till a clear solution is obtained. A further increase in temperature in the range of 400 to 600° C. allows the combustion of metal salts and fuel. As the temperature increases, the fuel in the mixture ignites and provides sufficient energy to transform the metal salts into nanoparticles. Excessive heat evaporates the water, and a solid product is obtained. The solid product is ground into a mortar to obtain a fine powder with particles of a uniform size.

At step 106, the method 100 includes calcinating the powder at a temperature of 600 to 800° C. for 2 to 4 hours. The powder is placed in a container and subjected to calcination. The container may be a crucible or a porcelain dish. In some embodiments, the powder is placed in a porcelain dish. The calcination may be carried out by placing the container with powder into a calcining device such as a calciner or a rotary kiln. The calcining device may be equipped with a temperature control system, which may provide high temperatures of about 600° C. to about 800° C. In some embodiments, calcination of the powder is carried out at a temperature of 600 to 800° C., preferably 620 to 780° C., preferably 640 to 760° C., preferably 660 to 740° C., more preferably 680 to 720° C., and yet more preferably about 700° C. In a preferred embodiment, the calcination of the powder is carried out at temperature of 700° C. In some embodiments, the calcination is carried out for 2 to 4 hours, preferably 2.5 to 3.5 hours, and more preferably about 3 hours to form a calcined product.

At step 108, the method 100 includes mixing the calcined product with a nitrogen-containing precursor and heating to a temperature of 550 to 650° C. for 20 to 60 minutes. The nitrogen precursor is preferably a compound that is capable of producing carbon nitride, preferably a graphitic carbon nitride. Suitable nitrogen-containing precursors for the synthesis of carbon nitride include, but are not limited to, melamine, urea, thiourea, cyanamide, dicyandiamide, guanidine, a combination thereof, and the like. In certain embodiments, the calcined product is mixed with melamine. In other embodiments, the calcined product is mixed with cyanamide or dicyandiamide. In preferred embodiments, the calcined product is mixed with urea. The mixture of the calcined product and urea is heated with a gradual increase in temperature. The heating is continued to a temperature of 550 to 650° C., preferably 560° C. to 640° C., about 570° C. to 630° C., about 580° C. to 620° C., about 590° C. to 610° C. is attained. In a preferred embodiment, the mixture of the calcined product and urea is heated to temperatures of about 600° C.

The mixture is heated for 20 to 60 minutes, preferably 25 to 55 minutes, preferably 30 to 50 minutes, more preferably 35 to 45 minutes, and yet more preferably about 40 minutes to obtain the nanocomposite. In a preferred embodiment, the calcined product is mixed with urea at a temperature of 600° C. for 40 minutes to form the g-$C_3N_4$@CuO/MgAl$_2$O$_4$ nanocomposite.

The nanocomposite was tested for their quality and performance as anti-cancer agents. The nanocomposite was subjected to X-ray diffraction (XRD). The results showed that different crystalline phases of the components were present in the g-$C_3N_4$@CuO/MgAl$_2$O$_4$ nanocomposite. In some embodiments, the phases in the nanocomposite include a copper oxide (CuO) phase, a magnesium oxide (MgO) phase, a magnesium aluminum oxide (MgAl$_2$O$_4$) phase, and a graphite-phase carbon nitride (g-$C_3N_4$) phase. In some embodiments, the phases in the nanocomposite do not include phases such as oxynitrides, aluminum oxide, and amorphous carbon. In some embodiments, the XRD further shows that the MgO phase is cubic and the MgAl$_2$O$_4$ phase is spinel.

A method for inhibiting cell growth in a cancer is described. The method includes contacting the g-$C_3N_4$@CuO/MgAl$_2$O$_4$ nanocomposite with the cancer to inhibit the growth of cancer. The cancer includes cells from a cell line selected from a group consisting of a human hepatocellular carcinoma (HepG-2) cell line and a human breast carcinoma (MCF-7) cell line. The g-$C_3N_4$@CuO/MgAl$_2$O$_4$ nanocomposite may be used to inhibit various types of cancers including carcinomas such as human hepatocellular carcinoma (HepG-2), human breast carcinoma (MCF-7), prostatic adenocarcinoma, colorectal adenocarcinoma, ovarian carcinoma, lung cancers, pancreatic cancers, uterine cancers, cervical cancers, a combination thereof, and the like. The nanocomposite may also be used to prevent the recurrence of cancers. The nanocomposite may be used alone or in combination with other therapies and/or medications for prophylaxis and/or therapeutic treatment of cancer.

In some embodiments, the method includes contacting the cancer with the g-$C_3N_4$@CuO/MgAl$_2$O$_4$ nanocomposite at a concentration of 1 µg/mL or more. In some embodiments, the method includes contacting the cancer with the g-$C_3N_4$@CuO/MgAl$_2$O$_4$ nanocomposite at a concentration of 1 µg/mL or more, preferably 2 µg/mL or more, preferably 5 µg/mL or more, preferably 10 µg/mL or more, preferably 20 µg/mL or more, preferably 50 µg/mL or more, preferably 100 µg/mL or more, preferably 200 µg/mL or more, preferably 250 µg/mL or more, preferably 300 µg/mL or more, preferably 400 µg/mL or more, and preferably 500 µg/mL or more. The amount of nanocomposite may be adjusted according to the type and stage of cancer and the subject's condition. In an exemplary embodiment, the g-$C_3N_4$@CuO/MgAl$_2$O$_4$ nanocomposite can be used to inhibit growth of hepatocellular carcinoma (HepG-2) cells. In another exemplary embodiment, the g-$C_3N_4$@CuO/MgAl$_2$O$_4$ nanocomposite can be used to inhibit growth of human breast carcinoma (MCF-7) cells. In some embodiments, the nanocomposite is effective at inhibiting cell growth in a cancer at a concentration of about 1 µg/mL. In some embodiments, a cancer cell line is less than 15% viable, preferably less than 12% viable, preferably less than 10% viable, preferably less than 8% viable, preferably less than 5% viable, and preferably less than 2% viable at a g-$C_3N_4$@CuO/MgAl$_2$O$_4$ nanocomposite concentration of 500 µg/mL In some embodiments, the cell line is the HepG-2 cell line and the g-$C_3N_4$@CuO/MgAl$_2$O$_4$ nanocomposite has a half-maximal inhibitory concentration ($IC_{50}$) value of 50 to 70 μg/mL, preferably 52 to 69 μg/mL, preferably 54 to 68 μg/mL, preferably 56 to 67 μg/mL, preferably 58 to 66 μg/mL, preferably 60 to 65 μg/mL, more preferably 61 to 63 μg/mL, and yet more preferably about 61.96 μg/mL. In some embodiments, the cell line is the MCF-7 cell line and the g-$C_3N_4$@CuO/$MgAl_2O_4$ nanocomposite has a half-maximal inhibitory concentration ($IC_{50}$) value of 100 to 120 g/mL, preferably 101 to 118 μg/mL, preferably 102 to 116 μg/mL, preferably 103 to 114 μg/mL, preferably 104 to 112 μg/mL, preferably 105 to 110 μg/mL, more preferably 106 to 108 μg/mL, and yet more preferably about 107.41 μg/mL.

In some embodiments, the nanocomposite may be formulated by medicinal preparations by adding pharmaceutically acceptable excipients to the nanocomposite. The excipients may include suitable polymers, surfactants, stabilizers, preservatives, buffers, coloring and flavoring agents, a combination thereof and the like.

In some embodiments, the method further includes administering the g-$C_3N_4$@CuO/$MgAl_2O_4$ nanocomposite to a subject having cancer and reducing a number of cancer cells in the subject having cancer. In some embodiments, treatment of cancer in a subject includes administering the nanocomposite to the subject having cancer and the nanocomposite reduces the number of cancer cells in the subject and/or eradicates the cancer over a period of time. The nanocomposite can be administered through various routes including oral, intravenous, intraperitoneal, intramuscular, subcutaneous, rectal routes, via topical application, transdermal patches, a combination thereof, and the like. Accordingly, the nanocomposite be formulated as tablets, powder, liquid suspensions, injectables, suppositories, transdermal patches, a combination thereof, and the like depending on the type of cancer to be treated.

EXAMPLES

The following examples describe and demonstrate a method of inhibiting cell growth in a cancer with a g-$C_3N_4$@CuO/$MgAl_2O_4$ nanocomposite (also referred to as $C_3N_4$@CuO/$MgAl_2O_4$, nanocomposite, g-$C_3N_4$@CuO/$MgAl_2O_4$ nanohybrid, or nanohybrid) and a method for preparation of the nanocomposite. The examples are provided solely for illustration and are not to be construed as limitations of the present disclosure, as many variations thereof are possible without departing from the spirit and scope of the present disclosure.

Example 1: Fabricating the g-$C_3N_4$@CuO/$MgAl_2O_4$ (10:5:85 wt. %) Nanohybrid Magnesium nitrate and aluminum nitrate were added in one beaker with copper nitrate to produce a CuO@$MgAl_2O_4$ composite. About 10 g of menthol as fuel was added to the beaker, followed by 30 mL of distilled water. The beaker was heated until a clear solution was obtained, then the clear solution was further heated further until dryness. The product was ground in a mortar, transferred to a 150 mL porcelain dish, and calcined at 700° C. for 3 hours. The calcinated CuO@$MgAl_2O_4$ product was cooled to room temperature, weighed, and then ground with urea to produce the g-$C_3N_4$@CuO/$MgAl_2O_4$ (10:5:85 wt. %) nanohybrid. The quadruple mixture was returned and heated to 600° C. for 40 minutes in a covered porcelain crucible and cooled to room temperature. The g-$C_3N_4$@CuO/$MgAl_2O_4$ (10:5:85 wt. %) nanohybrid was collected.

Example 2: Characterization

Figure 2:
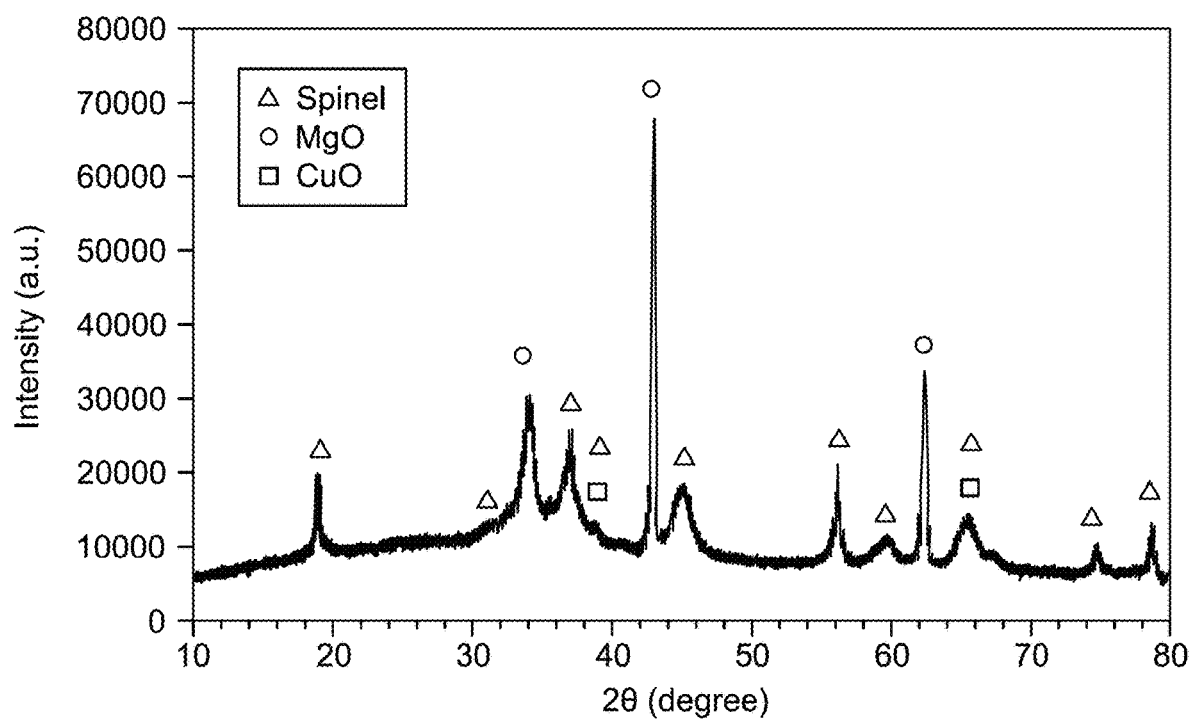
FIG. 2 depicts an X-ray diffraction (XRD) pattern of the g-$C_3N_4$@CuO/MgAl$_2$O$_4$ nanocomposite, according to certain embodiments.

XRD was used to examine the crystallinity and phase identification of the g-$C_3N_4$@CuO/$MgAl_2O_4$ nanohybrid, and the results are shown in FIG. 2. FIG. 2 illustrates the powder's high crystalline nature, as indicated by sharp peaks and high intensity values. CuO, MgO, $MgAl_2O_4$, and g-$C_3N_4$ phases are present in the g-$C_3N_4$@CuO/$MgAl_2O_4$ nanohybrid, as indicated by diffraction patterns using conventional powder diffraction file (PDF) cards. The 2θ values of 18.9°, 37.0°, 38.9°, 45.2°, 56.1°, 65.01°, 74.7°, and 78.7° were used to index a $MgAl_2O_4$ spinel phase. These diffractions correspond to the cubic phase of $MgAl_2O_4$ spinel's (111), (311), (222), (400), (422), (440), (620), and (622) plans, respectively (PDF card, No. 9002164). At 2θ values of 37.0°, 43.0°, 62.4°, and 74.7°, the cubic phase of MgO (PDF card, No. 9006789) was detected. These diffractions originated from (111), (200), (220), and (311) planes, respectively. MgO is present together with the $MgAl_2O_4$ spinel phase. A tenorite phase of CuO is represented by diffractions at 2θ values of 38.9° and 65.5° (JCPDS No. 00-9016326). The emergence of weak CuO diffraction suggests that the CuO has completely dissolved within the spinel and g-$C_3N_4$ lattices. At 36.9°, 45.8°, and 59.1°, g-$C_3N_4$-related diffractions were detected. The successful production of g-$C_3N_4$@CuO/$MgAl_2O_4$ was shown by the absence of additional phases (such as $Al_2O_3$).

Figure 3A:
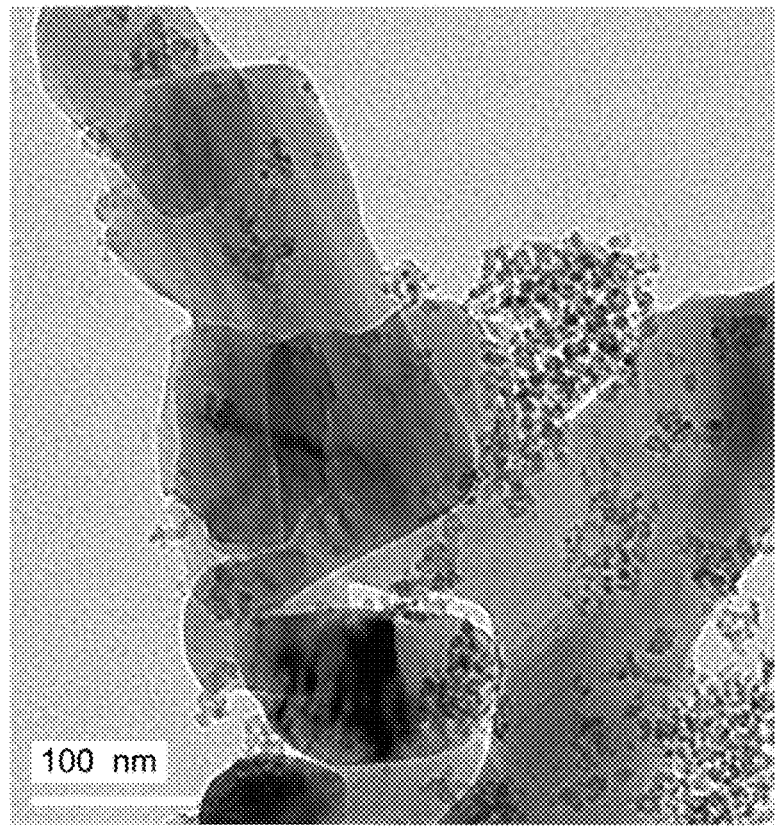
FIG. 3A is a transmission electron microscopy (TEM) image of the g-$C_3N_4$@CuO/MgAl$_2$O$_4$ nanocomposite, according to certain embodiments.
Figure 3B:
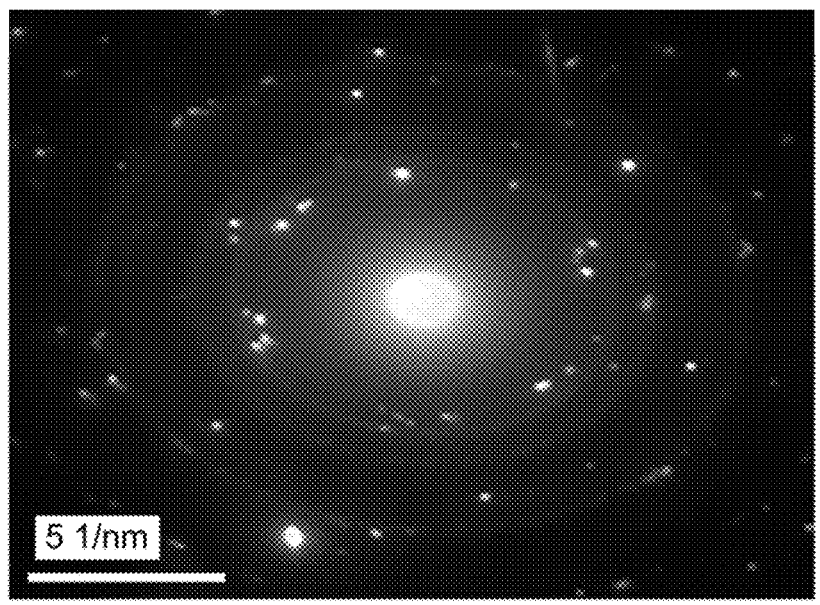
FIG. 3B is a selected area electron diffraction (SAED) pattern for the g-$C_3N_4$@CuO/MgAl$_2$O$_4$ nanocomposite, according to certain embodiments.
Figure 3C:
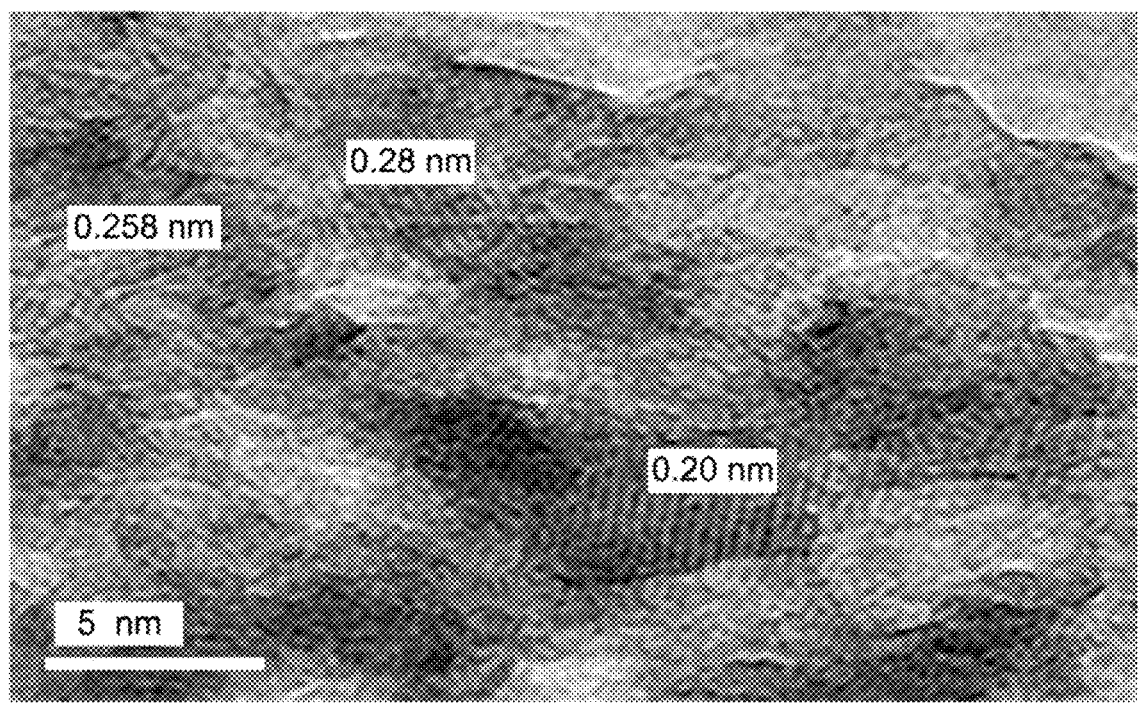
FIG. 3C is a high-resolution transmission electron microscopy (HR-TEM) image of the g-$C_3N_4$@CuO/MgAl$_2$O$_4$ nanocomposite, according to certain embodiments.
Figure 3D:
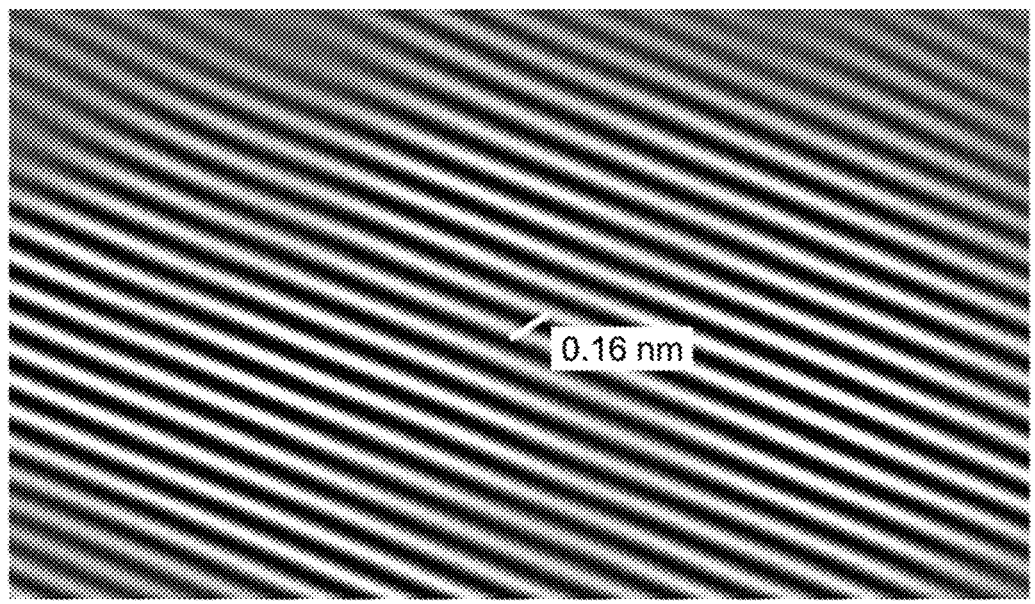
FIG. 3D is a fast Fourier transform (FFT) spectra of the g-$C_3N_4$@CuO/MgAl$_2$O$_4$ nanocomposite, according to certain embodiments.
Figure 3E:
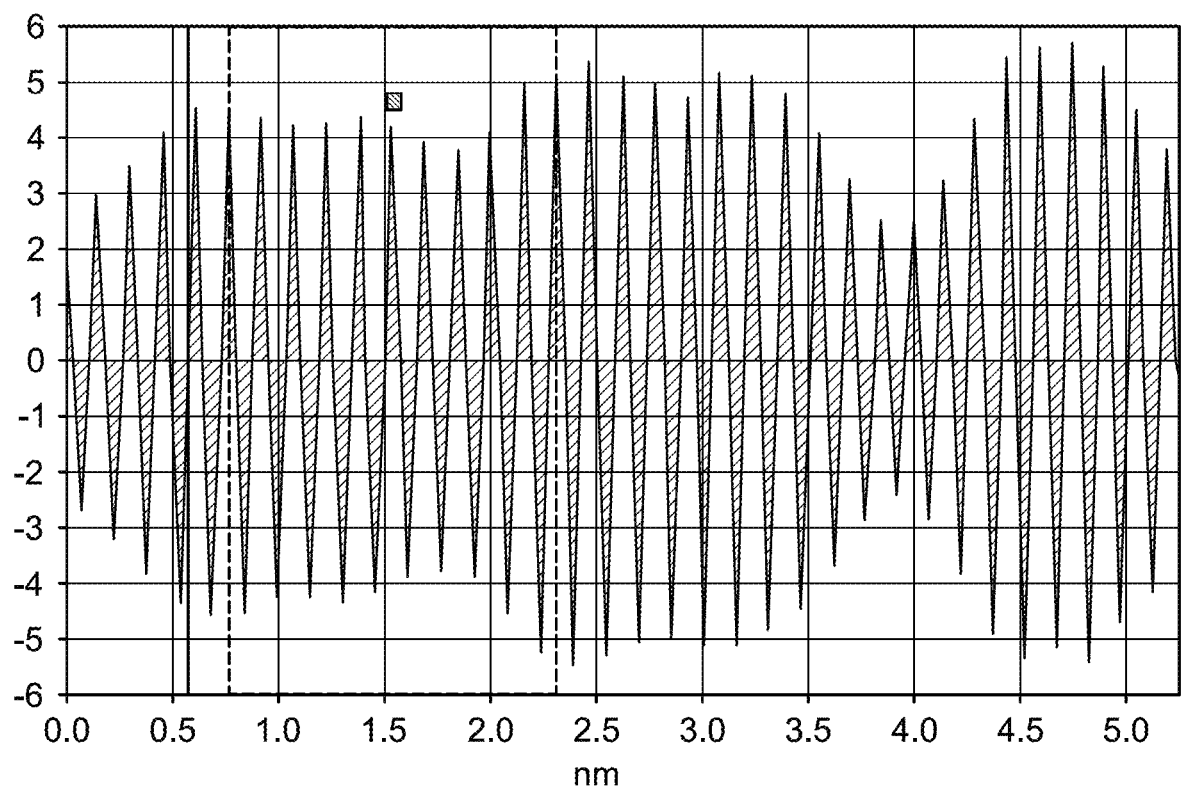
FIG. 3E is an inverse fast Fourier transform (IFFT) spectra of the g-$C_3N_4$@CuO/MgAl$_2$O$_4$ nanocomposite, according to certain embodiments.

TEM images of g-$C_3N_4$@CuO/$MgAl_2O_4$ nanocomposite are presented in FIG. 3A. The TEM images illustrate a two-dimensional porous structure of the nanocomposite constructed with curled and wrinkled nanosheets and platelets of the g-$C_3N_4$ with an average width of 135 nm and an average length of 222 nm. The image also shows well dispersion of homogeneous spherical metal oxides nanoparticles with size of 5.4 nm on the nanosheets of g-$C_3N_4$. The corresponding SAED pattern reveals diffraction spots with interplanar spacings of 0.23 nm, 0.219 nm, 0.17 nm, 0.146 nm, 0.122 nm, and 0.10 nm due to (111, CuO), (200, MgO), (422, spinel), (220, MgO), (620, spinel), and (622, spinel) diffraction planes (FIG. 3B). The corresponding HR-TEM of the composite shows a plane spacing of 0.33 nm related to the (002) plane of CN, and 0.25 nm and 0.2 nm are related to the (222) and (400) planes, respectively, of spinel, characterizing the heterostructure formation (FIG. 3C). Fast Fourier transform (FFT) (FIG. 3D) and inverse fast Fourier transform (IFFT) (FIG. 3E) measurements show a d-value of 0.16 nm given to the g-$C_3N_4$@CuO/$MgAl_2O_4$ nanocomposite, signifying a lattice spacing of (422), indicating development of a spinel structure.

Anticancer Activity

Cells were grown on RPMI-1640 medium supplemented with 10% inactivated fetal calf serum and 50 μg/mL gentamycin. The cells were maintained at 37° C. in a humidified atmosphere with 5% $CO_2$ and were sub-cultured two to three times a week.

Cytotoxicity Evaluation Using Viability Assay

For antitumor assays, the tumor cell lines were suspended in the medium at concentration $5 \times 10^4$ cells/well in Corning 96-well tissue culture plates, and then incubated for 24 hr. The nanocomposite was then added into 96-well plates (three replicates) to achieve ten concentrations for the nanocomposite. Six vehicle controls with media were run for each 96 well plate as a control. After incubating for 24 h, the numbers of viable cells were determined by an MTT test. Briefly, the media was removed from the 96 well plate and replaced with 100 μL of fresh culture RPMI 1640 medium without phenol red then 10 μL of the 12 mM MTT stock solution (5 mg of MTT in 1 mL of PBS) to each well including the untreated controls. The 96 well plates were then incubated at 37° C. and in 5% $CO_2$ for 4 hours. An 85 µL aliquot of the media was removed from the wells, and 50 µL of DMSO was added to each well and mixed thoroughly with the pipette and then incubated at 37° C. for 10 minutes. This was followed by optical density measurement at 590 nm with a microplate reader (SunRise, TECAN, Inc, USA) to determine the number of viable cells. The percentage of viability was calculated as:

Viability (%)=[(OD$t$/OD$c$)]×100 where "OD$t$" is the mean optical density of wells treated with the tested sample and "OD$c$" is the mean optical density of untreated cells.

The relation between surviving cells and sample (i.e., nanocomposite) concentration is plotted to obtain a survival curve of each tumor cell line after treatment with the nanocomposite. A half-maximal (50%) inhibitory concentration ($IC_{50}$) needed to cause toxic effects in 50% of intact cells was estimated from graphic plots of the dose-response curve for each concentration using Graphpad Prism software (San Diego, CA).

Figure 4:
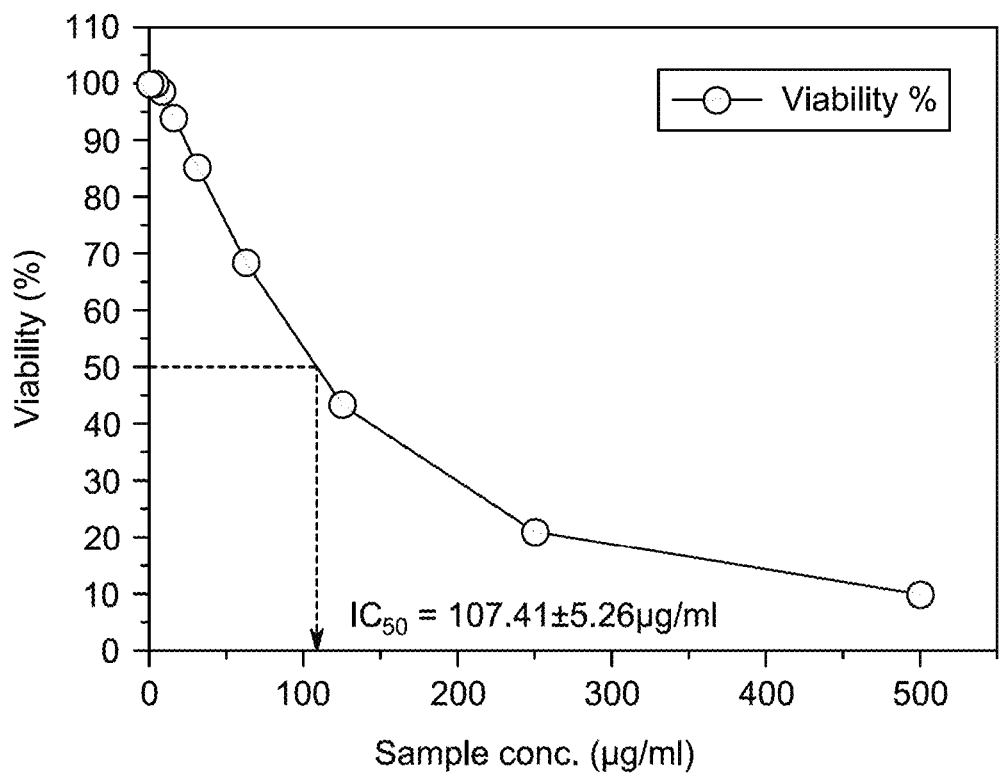
FIG. 4 is a graph depicting inhibitory activity of the g-$C_3N_4$@CuO/MgAl$_2$O$_4$ nanohybrid against MCF-7 cells, according to certain embodiments.

An in-vitro investigation was conducted for the g-$C_3N_4$@CuO/MgAl$_2$O$_4$ nanocomposite against a Human Hepatocellular Carcinoma (HepG-2) cell line and a human Breast carcinoma (MCF-7) cell line. The g-$C_3N_4$@CuO/MgAl$_2$O$_4$ nanocomposite was subjected to the MCF-7 cell line at a concentration of 3.0 to 500 µg/mL, and the results are illustrated in FIG. 4. The MCF-7 cell line's viability started declining at a 4.0 µg/mL g-$C_3N_4$@CuO/MgAl$_2$O$_4$ nanocomposite dose. The $IC_{50}$ was 107.41 µg/mL, and the maximum dose (500 µg/mL) showed a 90% inhibition of the MCF-7.

Figure 5:
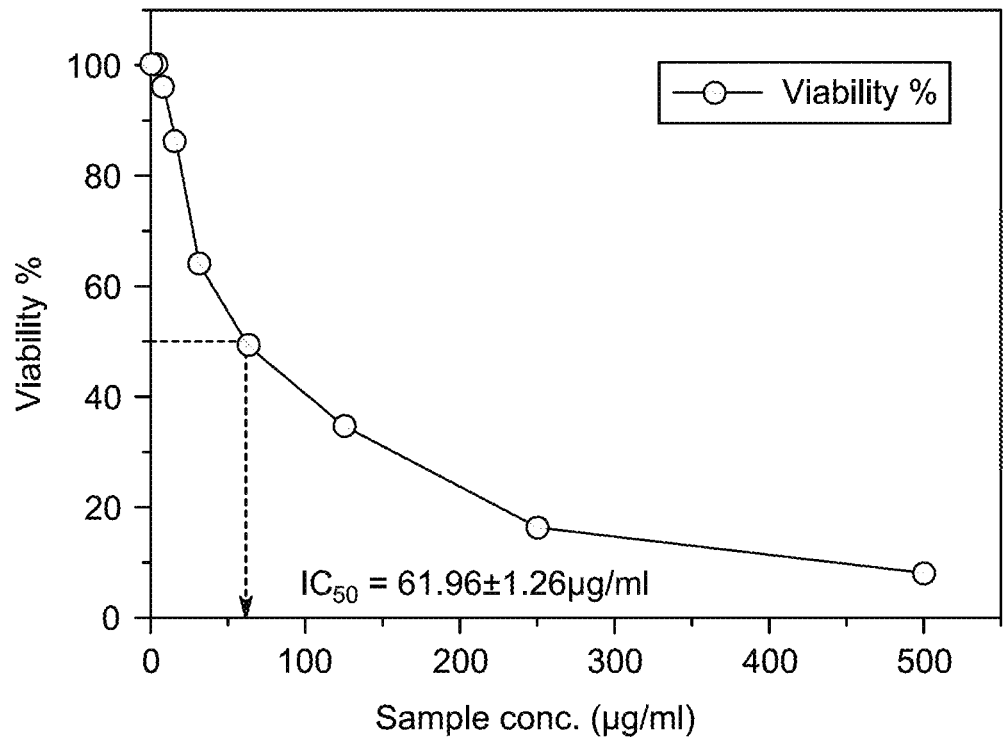
FIG. 5 is a graph depicting inhibitory activity of the g-$C_3N_4$@CuO/MgAl$_2$O$_4$ nanohybrid against HepG-2 cells, according to certain embodiments.

The g-$C_3N_4$@CuO/MgAl$_2$O$_4$ was subjected to the HepG-2 cell line at a concentration of 3.0 to 500 µg/mL, and the results are illustrated in FIG. 5. The HepG-2 cell line's viability started declining at a concentration of 4.0 µg/mL of the g-$C_3N_4$@CuO/MgAl$_2$O$_4$ nanocomposite. The $IC_{50}$ was 61.96 µg/mL, and the maximum dose (500 µg/mL) showed a 90% inhibition of the HepG-2. Numerous modifications and variations of the present disclosure are possible in light of the above teachings. It is therefore to be understood that within the scope of the appended claims, the disclosure may be practiced otherwise than as specifically described herein.

The invention claimed is:

1. A method of inhibiting cell growth of cancer cells, comprising:
contacting a graphite-phase carbon nitride copper oxide and magnesium aluminum oxide (g-$C_3N_4$@CuO/MgAl$_2$O$_4$) nanocomposite with the cancer cells to inhibit growth of the cancer cells,
wherein the g-$C_3N_4$@CuO/MgAl$_2$O$_4$ nanocomposite comprises a graphite-phase carbon nitride (g-$C_3N_4$) in an amount of 2 to 18 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ nanocomposite,
wherein the cancer cells are from a cell line selected from a group consisting of a HepG-2 cell line and a MCF-7 cell line.

2. The method of claim 1, wherein the cell line is the HepG-2 cell line and the g-$C_3N_4$@CuO/MgAl$_2$O$_4$ nanocomposite has a half-maximal inhibitory concentration ($IC_{50}$) value of 50 to 70 µg/mL.

3. The method of claim 1, wherein the cell line is the MCF-7 cell line and the g-$C_3N_4$@CuO/MgAl$_2$O$_4$ nanocomposite has a half-maximal inhibitory concentration ($IC_{50}$) value of 100 to 120 µg/mL.

4. The method of claim 1, comprising contacting the cancer cells with the g-$C_3N_4$@CuO/MgAl$_2$O$_4$ nanocomposite at a concentration of 1 µg/mL or more.

5. The method of claim 1, wherein the cell line is less than 15% viable after contacting with the g-$C_3N_4$@CuO/MgAl$_2$O$_4$ nanocomposite concentration of 500 µg/mL.

6. The method of claim 1, wherein the g-$C_3N_4$@CuO/MgAl$_2$O$_4$ nanocomposite comprises a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ nanocomposite.

7. The method of claim 6, wherein the g-$C_3N_4$ is in the form of nanosheets having an average length of 100 to 500 nm and an average width of 50 to 250 nm.

8. The method of claim 7, wherein the copper oxide and the MgAl$_2$O$_4$ are in the form of nanoparticles having an average size of 2 to 10 nm and wherein the copper oxide and the MgAl$_2$O$_4$ nanoparticles are dispersed on the g-$C_3N_4$ nanosheets.

9. The method of claim 1, wherein the g-$C_3N_4$@CuO/MgAl$_2$O$_4$ nanocomposite has a Brunauer-Emmett-Teller (BET) surface area of 15 to 30 $m^2\ g^{-1}$.

10. The method of claim 1, wherein the g-$C_3N_4$@CuO/MgAl$_2$O$_4$ nanocomposite is porous and has an average pore diameter of 5 to 10 nm.

11. The method of claim 1, wherein the g-$C_3N_4$@CuO/MgAl$_2$O$_4$ nanocomposite is porous and has an average pore volume of 0.01 to 0.2 $cm^3\ g^{-1}$.

12. The method of claim 1, wherein the g-$C_3N_4$@CuO/MgAl$_2$O$_4$ nanocomposite is porous, and the pores are in the form of slits.

13. The method of claim 1, wherein the g-$C_3N_4$@CuO/MgAl$_2$O$_4$ nanocomposite is crystalline.

14. The method of claim 1, wherein the g-$C_3N_4$@CuO/MgAl$_2$O$_4$ nanocomposite comprises a copper oxide (CuO) phase, a magnesium oxide (MgO) phase, a magnesium aluminum oxide (MgAl$_2$O$_4$) phase, and a graphite-phase carbon nitride (g-$C_3N_4$) phase.

15. The method of claim 14, wherein the MgAl$_2$O$_4$ phase is spinel.

16. The method of claim 14, wherein the MgO phase is cubic.

17. The method of claim 1, wherein the g-$C_3N_4$@CuO/MgAl$_2$O$_4$ nanocomposite does not comprise aluminum oxide (Al$_2$O$_3$).

18. The method of claim 1, wherein the g-$C_3N_4$@CuO/MgAl$_2$O$_4$ nanocomposite is made by a process, comprising:
mixing a magnesium salt, an aluminum salt, a copper salt, and a fuel in water to form a mixture;
heating the mixture to form a solid product;
calcinating the solid product at a temperature of 600 to 800° C. for 2 to 4 hours to form a product;
mixing the product with urea and heating to a temperature of 550 to 650° C. for 20 to 60 minutes to form the g-$C_3N_4$@CuO/MgAl$_2$O$_4$ nanocomposite.

19. The method of claim 18, wherein the fuel is menthol.

* * * * *